United States Patent
Von Der Straten

(10) Patent No.: US 6,704,323 B1
(45) Date of Patent: Mar. 9, 2004

(54) METHOD AND DEVICE FOR AUTOMATIC CONFIGURATION OF A SUBSCRIBER'S INSTALLATION WITH A NETWORK INTERFACE UNIT

(75) Inventor: Gernot Von Der Straten, Tutzing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/508,296

(22) PCT Filed: Sep. 8, 1998

(86) PCT No.: PCT/EP98/05752

§ 371 (c)(1),
(2), (4) Date: Mar. 8, 2000

(87) PCT Pub. No.: WO99/13678

PCT Pub. Date: Mar. 18, 1999

(30) Foreign Application Priority Data

Sep. 8, 1997 (EP) .............................................. 97115554

(51) Int. Cl.⁷ ................................................ H04J 12/66
(52) U.S. Cl. ........................ 370/463; 709/232; 709/233
(58) Field of Search ............................. 370/235, 235.1, 370/236, 229, 259, 264, 265, 267, 268, 269, 463, 464, 468, 522, 524; 709/300, 301, 303, 232, 236, 233; 379/399, 93.01

(56) References Cited

U.S. PATENT DOCUMENTS

| 5,305,318 A | | 4/1994 | Ozeki et al. | |
|---|---|---|---|---|
| 5,317,415 A | | 5/1994 | Kinami et al. | |
| 5,365,517 A | * | 11/1994 | Kato | ........................... 370/251 |
| 5,907,549 A | * | 5/1999 | Nagao | ........................ 370/384 |
| 6,009,106 A | * | 12/1999 | Rustad | ........................ 370/523 |
| 6,023,473 A | * | 2/2000 | Reine | ........................... 370/463 |
| 6,434,623 B1 | * | 8/2002 | Sasaki | ......................... 709/232 |
| 6,510,467 B1 | * | 1/2003 | Behfar | ......................... 709/233 |
| 6,526,067 B1 | * | 2/2003 | Weiss | .......................... 370/468 |
| 6,560,244 B1 | * | 5/2003 | Huber | ......................... 370/524 |

FOREIGN PATENT DOCUMENTS

| EP | 0 039 191 | 11/1981 |
|---|---|---|
| EP | 43 43 982 C1 | 8/1995 |

* cited by examiner

*Primary Examiner*—Douglas Olms
*Assistant Examiner*—Ricardo M. Pizarro
(74) *Attorney, Agent, or Firm*—McCormick, Paulding & Huber LLP

(57) ABSTRACT

Method and arrangement for automatically configuring subscriber equipment (En) with a network interface unit (NIU) for adapting to a terminal unit (AFRA-NT) of a digital network (AN), whereby the data rate of this network interface unit (NIU) can be adaptively adjusted. Such method has the steps:

determining the maximum data rate between network interface unit, or terminal unit, respectively, and another unit of the digital network (AN);

comparing the determined data rate to a value, which is stored in the subscriber equipment (En), of a previous maximum data rate;

storing the determined data rate in the subscriber equipment (En);

comparing the determined data rate to the data rate demand of currently existing connections of terminal device applications of the subscriber equipment (En); and configuring the determined maximum data rate as the maximum allowable data rate of the network interface unit (NIU) if the data rate demand of currently existing connections does not exceed the determined maximum data rate.

9 Claims, 4 Drawing Sheets

METHOD AND DEVICE FOR AUTOMATIC CONFIGURATION OF A SUBSCRIBER'S INSTALLATION WITH A NETWORK INTERFACE UNIT

BACKGROUND OF THE INVENTION

1. Field of the Invention

The present invention relates to a method for configuring subscriber equipment with a network interface unit for adapting the subscriber equipment to a terminal unit of a digital network when the data rate of the terminal unit can be adaptively adjusted dependent on the actual transmission conditions.

2. Description of the Related Art

Modern telecommunications networks have digital extension networks at their disposal in the subscriber terminal region, which networks connect one or more local exchanges to subscriber equipment via subscriber lines with the aid of terminal units. From the standpoint of the extension network, such subscriber equipment is subscriber terminal equipment, though it can, for example, be realized at the subscriber side as a switching system or a multiplexer having several different terminal devices or terminal device applications, respectively. Such terminal device applications can be audio telephony, video telephony, data network applications or Internet applications, for example. They can also be a matter of what is known as a set top box for converting digital video or sound information, which can be connected to an extension line network either directly or via switching equipment. It is also possible to transmit both network data and packet data between the subscriber equipment and the extension line network as needed. Here, the transmission bandwidth demand—that is, the bitrate to be transmitted between the allocated terminal unit of the extension line network and the network interface unit of the subscriber equipment—is dependent on the bandwidth demand of the currently active terminal device applications, particularly on the type of these applications and the number of simultaneously active applications.

Extension line networks were originally designed for transmitting low-frequency information signals such as in analog telecommunications or when using narrowband services. The bitrate that is transmitted on the subscriber side in the extension line network is 2×64 kBit/s for 2 B channels (payload channels) plus 16 kBit/s for a D channel (control channel) for narrowband ISDN, for example, which is specified such that the longest available extension lines can still be used. But at the same time, with shorter extension lines a large part of the maximum allowably transmittable bitrate—that is, the maximum bandwidth in the extension line network region—goes unused. The damping factor for symmetric dual wires of copper extension lines, which limits the range of the digital signal transmission, rises with line length. In general, the shorter the length of a subscriber line, the higher the bitrate that can be transmitted thereover. Extension line networks designed for narrowband services are thus also suitable for transmitting broad band services. Methods have appeared in recent years with which the existing copper cables in the extension line network can be used for transmitting digital information signals. These include what is known as the ADSL method, (Asymmetrical Digital Subscriber Line), and what is known as the HDSL method (High Bitrate Digital Subscriber Line).

German Patent Document DE 43 43 982 describes an extension line network with subscriber lines for transmitting digital information signals, in which bit patterns are sent via a subscriber line by a local exchange, and, after being reflected at the subscriber and sent back again, the bit patterns are evaluated, in order to establish the maximum possible bitrate per transmission line. The received bit patterns are then evaluated in the exchange. The maximum possible bitrate is then specified depending on the results. As a method for transmitting information at the subscriber side in such subscriber line networks, the article "Modelling of a Multi-Queue Polling System with Arbitrary Server Interrupts for the Idle-Slot-Concatenation Packet Switching Principle in a Hybrid CS/PS Node"(M. N. Huber and P. J. Kühn, *Proceedings of the 12$^{th}$ International Teletraffic Congress*, Torino, 1988) teaches the provision of an information transport frame that is divided into time slots of equal size. Each of these time slots is occupied:either by switching system data (CS data: Circuit Switching) or packet data (PS data: Packet Switching), all time slots that are not occupied by switching system data being combined into a residual packet data transport channel (Idle Slot Concatenation). The traffic type by which the residual packet data transport channel is occupied, for instance ATM or LAN/Ethernet, is determined by the network configuration, particularly by the packet data protocol that can be processed by the protocol evaluating equipment at the subscriber side.

SUMMARY OF THE INVENTION

It is an object of the invention to lay out how to configure subscriber equipment for a more flexible use of extension line networks.

This object and others are achieved by a method for automatically configuring subscriber equipment with a network interface unit for adapting the subscriber equipment to a terminal unit of a digital network, whose data rate can be adaptively adjusted dependent on the actual transmission conditions in the digital network, with the steps of:

determining the current maximum possible data rate between the network interface unit and terminal unit with the aid of an exchange of messages between these units;

comparing the determined current maximum possible data rate to a value, which is stored in the subscriber equipment, of a previously current maximum possible data rate;

storing the determined current maximum possible data rate in the subscriber equipment if this comparison reveals a deviation;

comparing the determined current maximum possible data rate to the data rate demand of currently existing connections of terminal device applications of the subscriber equipment; and configuring the determined current maximum possible data rate as the maximum allowable data rate of the network interface unit if the; data rate demand of currently existing connections does not exceed the determined current maximum possible data rate. The objects of the invention are also achieved and by subscriber equipment with a data processing system that has a processing unit, a storage unit, and a system bus, for purposes of realizing a terminal device application, and that has a network interface unit for purposes of adapting the system bus to a terminal unit of a digital network, the data rate of which can be adaptively adjusted dependent on the actual transmission conditions; the subscriber equipment having means for determining the current maximum possible data rate between the network interface unit and the digital network terminal unit, means for storing a value of the maximum possible data rate, means for comparing the stored value of the maximum possible data rate to the value of the determined current maximum possible data rate, means for configuring a maximum allowable data rate of the network interface unit, and means for denying a connection set-up request of the terminal device application if the data rate demand of this connection that is to be set up exceeds the maximum allowable data rate.

An inventive method serves for the automatic configuring of subscriber equipment that has a network interface unit for adapting the subscriber equipment to a terminal unit of a digital network, whereby the data rate of this network interface unit is adaptively adjusted dependent on the actual transmission conditions. Such a method has the steps:

Determining the actual maximum possible data rate between network interface unit and terminal unit, or another unit of the extension line network, respectively, with the aid of a message exchange between network interface unit and terminal unit;

comparing the determined actual maximum possible data rate to a value, which is stored in the subscriber equipment, of a previously current maximum possible data rate;

storing the determined current maximum possible data rate in the subscriber equipment if this comparison shows a deviation;

comparing the determined current maximum possible data rate to the data rate demand of currently existing connections of terminal device applications of the subscriber equipment;

and configuring the determined current maximum possible data rate as the maximum allowable data rate of the network interface unit if the data rate demand of currently existing connections does not exceed the determined current maximum possible data rate.

The value of the previous maximum possible data rate is the value of the data rate that is actually supported in the determination of the current maximum possible data rate between the network interface unit or terminal unit, respectively, and the switching equipment Ve or a concentrator in the extension line network AN, respectively. This value can have an upper limit defined by an administratively set limit value, if, for example, the subscriber gets a lower data rate from the network operator than would be technically possible. But its upper limit can also be defined by technical transmission parameters. If the maximum possible data rate is limited by an administratively set limit value, then of course a supported maximum data rate cannot exceed this limit value, regardless of the physical conditions.

The described inventive method leaves it to higher layers, for instance the application layer, to clear existing connections or to maintain them if the transmission quality is limited, for instance due temporary interference, and would in fact necessitate a reduction of the transmission bandwidth. Despite this, it is guaranteed that the transmission quality is guaranteed when the bandwidth of existing connections no longer exceeds the lower current maximum possible data rate that was determined.

A development of this kind of method for automatically configuring subscriber equipment additionally provides that when this data rate demand exceeds the current maximum possible data rate that was determined, the data rate demand of currently existing connections is checked, and that when this data rate demand no longer exceeds the determined current maximum possible data rate, the determined current maximum possible data rate is configured as the maximum allowable data rate of the network interface unit.

This guarantees that the required transmission quality is guaranteed as soon as the bandwidth of existing connections no longer exceeds the lower current maximum possible data rate that was determined.

A particularly favorable development of a method for inventively automatically configuring subscriber equipment contains the additional step that, when the data rate demand of currently existing connections exceeds the determined current maximum possible data rate, a message is delivered to at least one terminal device application of the subscriber equipment for which currently existing connections are set up, in order to indicate that the transmission quality is not guaranteed. In this case, it can be decided in the application layer or in a higher layer whether the connections with higher bit error rates should also be maintained, or if one or more connections should be cleared down.

In a development of an inventive method, when the determined current maximum possible data rate is configured as the maximum allowable data rate of the network interface unit, a message with the new maximum allowable data rate of the network interface unit is delivered to the terminal unit. The maximum allowable data rate of the network interface unit that is currently set in the subscriber equipment is thus also present in the terminal unit and can be supported accordingly.

Another expedient development of an inventive method for automatically configuring subscriber equipment contains the additional step of comparing the determined current maximum possible data rate to a value, which is stored in the subscriber equipment, of the maximum data rate that is supported by the terminal unit, and replacing the value of the determined current maximum possible data rate with the value of the maximum data rate supported by the extension line network AN if this is smaller than the value of the determined current maximum possible data rate. This development of the inventive method accounts for the case, among others, when the physical conditions would permit a higher data rate than is supported by the terminal unit of a network operator. It is irrelevant here whether the limitation of the maximum supported data rate is technically or administratively conditioned. For example, a technically conditioned limitation in such a case can be the limitation to a terminal in accordance with PCM30 standard and thus to 30 channels with a 64 kBit transmission rate, respectively, or to approximately 2 MHz bandwidth, respectively. Given an installed terminal in accordance with PCM30, an administrative limitation can be conditioned in that the subscriber has leased only one or a few terminals having two payload channels with a 64 kBit data rate each and a D channel with a 16 kBit data rate, and so the network operator only supports the correspondingly limited data rate in the extension line network.

One possibility to determine the current maximum possible data rate between the network interface unit and the terminal unit in an inventive method is to measure the transmission characteristics between the network interface unit or the terminal unit, respectively, and the extension line network Ve, AN using the error rate with the aid of an information exchange between these units. The terminal unit can then transmit the currently measured maximum transmission rate to the network interface unit as a parameter in the form of a message, for instance Capacity_Modification_Request,.

In an inventive method for automatically configuring subscriber equipment, the detection of the current maximum possible data rate between the network interface unit and the terminal unit can be prompted, for instance, by the transmission of a request message such as Max_Capacity_Request from the network interface unit to the terminal unit. The terminal unit, potentially upon inclusion of the network interface unit, can subsequently carry out a method for determining the current maximum possible data rate. The result can then be transmitted to the network interface unit and registered there. Accordingly, in this embodiment of an inventive method, the terminal unit is responsible for determining the maximum possible data rate, so that the corresponding process control can be used for all network interface units connected to a terminal unit. Despite this, every network interface unit can specify when the maximum possible data rate should be updated, depending on the applications just provided or the typical applications.

In a development of an inventive method, when a transmission system with several payload channels is provided between the network interface unit and terminal unit, the values of the data rates respectively correspond to a multiple of the data rate of one such payload channel.

As an arrangement for realizing an inventive method, subscriber equipment is provided which has a data processing system that includes a processing unit, a storage unit, and a system bus, in order to realize a terminal device application; and which has a network interface unfit (NIU) for adapting the system bus to a terminal unit (AFRA) of a digital network whose data rate can be adaptively adjusted depending on the actual transmission conditions. The subscriber equipment has means for determining the current maximum possible data rate between the network interface unit and the digital network terminal unit, means for storing a value of the maximum possible data rate, means for comparing the stored value of the maximum possible data rate to the value of the determined current maximum possible data rate, means for configuring a maximum allowable data rate of the network interface unit, and means for denying a connection set-up request of the terminal device application if the data rate demand of this connection that is to be set up exceeds the maximum allowable data rate.

The means for storing a value of the maximum possible data rate is preferably a semiconductor memory arrangement, though it can also be a storage device with a magnetic recording medium or with an optical storage medium. The means for comparing the stored value of the maximum possible data rate to the value of the determined current maximum possible data rate, the means for configuring a maximum allowable data rate of the network interface unit, and the means for denying a connection set-up request of the terminal device application, are preferably realized by a processor arrangement having corresponding program procedures.

An inventive method and an inventive arrangement make it possible for applications in subscriber equipment, that is, in a terminal system such as a personal computer, a set top box, or a work station, to optimally use a method for adaptively adjusting the data rate on a two-wire line using a communication protocol between a network interface unit (NIU) of the subscriber equipment and a terminal unit of a digital network, without affecting the allocated exchange of the digital network. The terminal unit and allocated exchange of the digital network can belong to an extension line network of the digital network.

BRIEF DESCRIPTION OF THE DRAWINGS

The invention is detailed below with reference to the Figures with the aid of an exemplifying embodiment.

DETAILED DESCRIPTION OF THE PREFERRED EMBODIMENTS

Figure 1:
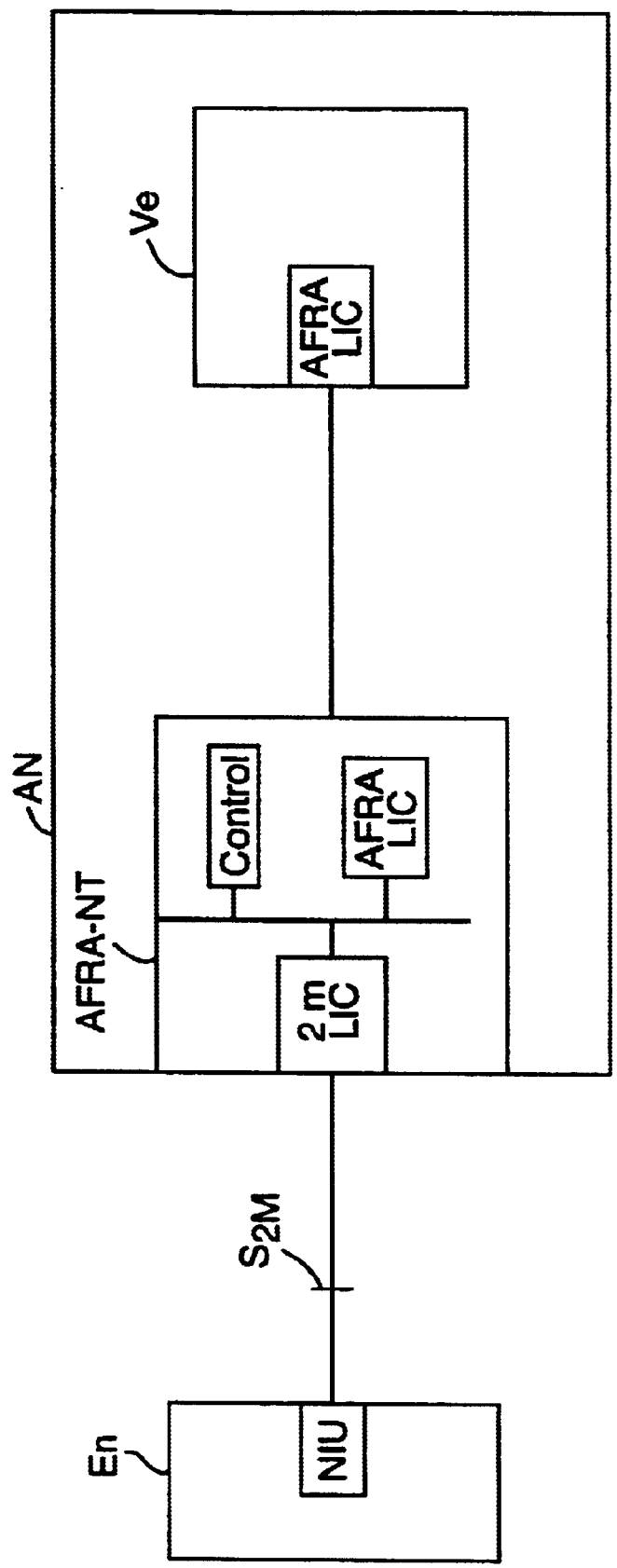
FIG. 1 depicts a schematic block diagram of an exemplifying embodiment of a subscriber unit, connected to an extension line network.

FIG. 1 depicts a schematic block illustration of subscriber equipment En with a network interface unit NIU. FIG. 1 also depicts an extension line network AN with a terminal unit AFRA-NT and an exchange Ve, which are connected to one another via a transmission path. In the exemplifying embodiment according to FIG. 1, the network interface unit NIU of the subscriber equipment En takes over the communication with the terminal unit AFRA-NT of the extension line network AN on one hand, and with applications such as a video conferencing application in the subscriber equipment (which applications are not illustrated), on the other hand.

The exemplifying embodiment illustrated in FIG. 1 is based on the assumption that an interface $S_{2M}$ with a bandwidth of 2 Mbit/s is used between the terminal unit AFRA-NT and the network interface unit NIU of the subscriber equipment En. For this, the terminal unit AFRA-NT contains an interface unit 2mLIC. In this case, the hardware of the network interface unit NIU and of the interface unit 2mLIC can correspond to that of an ISDN interface card with a bandwidth of 2 Mbit/s; that is, to a primary terminal (primary access). Between the network interface unit NIU and the terminal unit AFRA-NT, one of the 64 kBit/s channels of the primary terminal is used for the communication for control and measuring processes. This channel potentially corresponds to a channel that is provided for control purposes between the terminal unit AFRA-NT and a subscriber line interface AFRA-LIC (Line Interface Card) of an exchange Ve of the extension line network AN.

Figure 2:
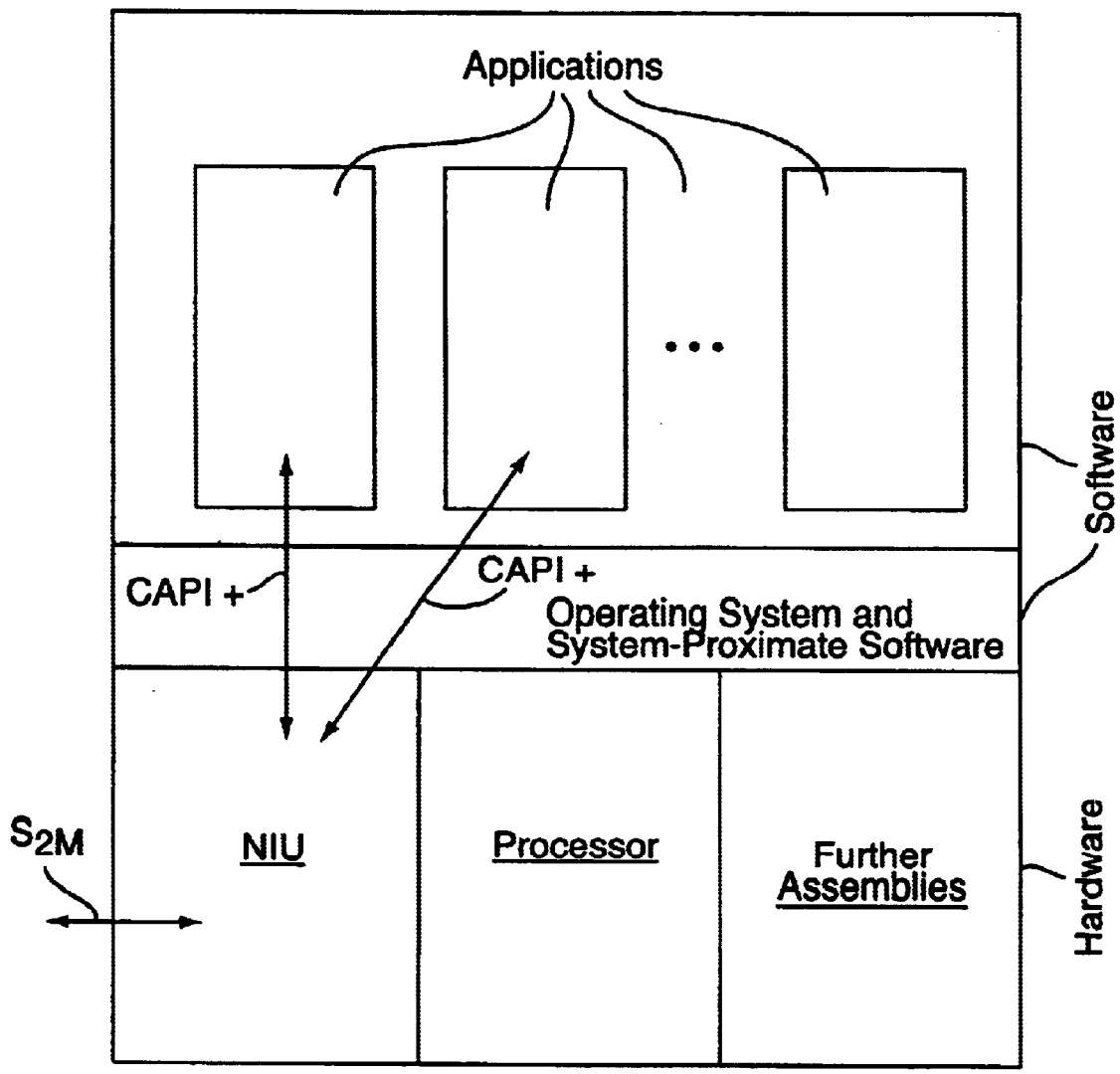
FIG. 2 depicts a schematic block illustration of an exemplifying embodiment of a subscriber unit, separated into hardware and software.

The network interface unit NIU must fit the system bus of the subscriber equipment En (which bus is not illustrated in detail), for instance an EISA of PCIBus interface. The interface between the network interface unit NIU and applications in the terminal system that are illustrated in FIG. 2 can correspond to an enhanced CAPI interface CAPI+, for example.

In this exemplifying embodiment, it is assumed that at a subscriber a terminal unit AFRA-NT of an extension line network AN is installed, which is connected with an exchange Ve of the extension line network AN and tested.

In the exemplifying embodiment, the proportioning of the transmission path has resulted in a maximum number $n_{max}$ of B channels, with $$2 \leq n_{max} \leq 30.$$

Here, $n_{max}$ is the maximum number of B channels that can be transmitted with a predeterminable maximum bit error rate on the line between an extension line interface AFRA-LIC of the terminal unit AFRA-NT and an extension line interface AFRA-LIC of an exchange Ve of the extension line network AN.

The subscriber has purchased the number $n_{admin}$ B channels from the operator for his terminal, with $$2 \leq n_{admin} \leq n_{max}.$$

The subscriber can thus occupy at the most the number $n_{admin}$ B channels at one time. The upper limit $n_{max}$ is entered in the subscriber data of the exchange Ve as the limitation for $n_{admin}$.

The subscriber can use less than $n_{admin}$ channels if the transmission characteristics on the subscriber line, and namely between the extension line interface AFRA-LIC of the exchange Ve of the extension line network AN and the subscriber equipment En, deteriorate even temporarily such that $n_{akt} \leq n_{admin}$ holds for the current maximum transmission rate $n_{akt}$ between extension line network AN and the subscriber equipment En. In this exemplifying-embodiment $n_{akt}$ is the number of B channels that can be transmitted on the basis of a current measurement of the bit error rate. The relation $2 \leq n_{akt} \leq n_{max}$ also holds for the number $n_{akt}$.

The number of B channels used by all applications in the subscriber equipment En at one point in time is referenced $n_{nutz}$ in the context of the exemplifying embodiment, whereby the following relation holds:

$$0 \leq n_{nutz} \leq n_{admin}.$$

The number of B channels that are used by an application, for instance video conferencing, in the subscriber equipment is referenced x in this example, for which the following relation holds:

$$1 \leq x \leq n_{admin}.$$

Figure 3A:
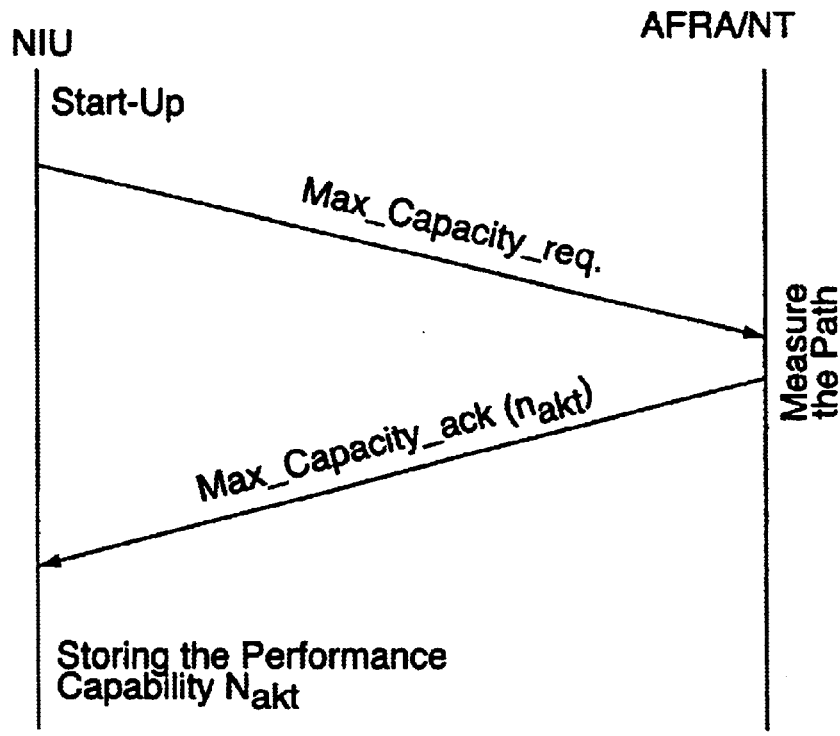
FIG. 3 depicts a flowchart of an exemplary flow of information between a network interface unit of a subscriber unit and a terminal unit of an extension line network.
Figure 3B:
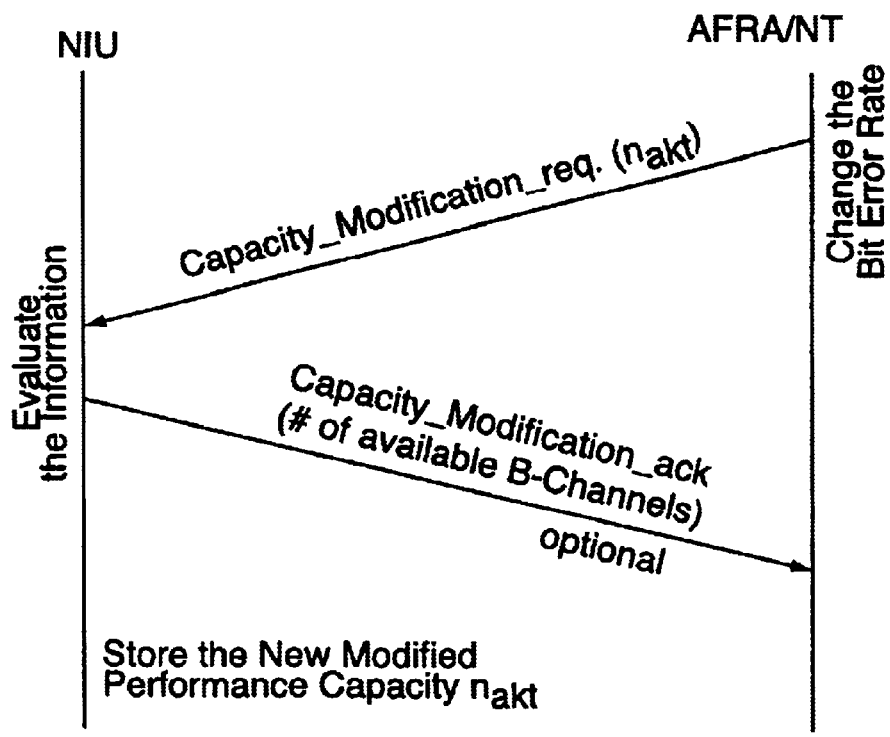

Procedures are detailed below with the aid of FIGS. 3A, 3B and 4 in the form of an exemplifying embodiment:

When the subscriber equipment En is switched on (see FIG. 3A), the network interface unit NIU requests the number $n_{akt}$ of the B channels currently available from the terminal unit AFRA-NT by means of the message Max_capacity_req (see FIG. 3A). The terminal unit AFRA-NT and the extension line interface AFRA-LIC then carry out the measurement of the transmission path between the terminal unit AFRA-NT and the exchange Ve.

The terminal unit AFRA-NT responds to the request with Max_Capacity_ack, which contains $n_{akt}$.

The network interface unit NIU then stores the value $n_{akt}$ and can deny connection set-up requests of the subscriber equipment En if the value $n_{akt}$ would be exceeded thereby. If the value $n_{akt}$ should be greater than the value $n_{admin}$, the exchange Ve rejects the calls that would lead to an exceeding of the value $n_{admin}$.

In the running mode, the terminal unit AFRA-NT and the extension line interface AFRA-LIC detect a change in the transmission characteristics by routine measurements of the line. The terminal unit AFRA-NT then delivers the message Capacity_Modification_req (see FIG. 3B) to the network interface unit NIU, which message contains the number $n_{akt}$ as a parameter. If the new value $n_{akt}$ is greater than the value stored in the network interface unit NIU, the new value for $n_{akt}$ is stored, and the network interface unit NIU responds with the message Capacity_Modification_ack. If the new value for $n_{akt}$ is less than the old value, the network interface unit NIU also checks if $n_{nutz>nakt}$ (new) applies.

If this is not the case, the network interface unit NIU responds with Capacity_Modification_ack and informs the terminal unit AFRA-NT of the numbers of released B channels.

The terminal unit AFRA-NT and the extension line interface AFRA-LIC in the exchange VE subsequently reduce the bitrate on the extension line.

If the new value for $n_{akt}$ is less than the number $n_{nutz}$ of the currently used B channels, the network interface unit NIU does not respond to the message Capacity_Modification_request. Instead, it can inform applications in the terminal system, insofar as they allow, by means of a message Capacity_Modification_Indication, that the quality of service can no longer be guaranteed for all channels, and that the number of B channels should therefore be reduced (see FIG. 4). It is then the responsibility of the applications to respond to this information appropriately.

When connections are cleared in this state, then, given a request by an application, the network interface unit NIU only sets up new connections if $n_{akt}$ is not exceeded due to the new connection set-up.

Figure 4:
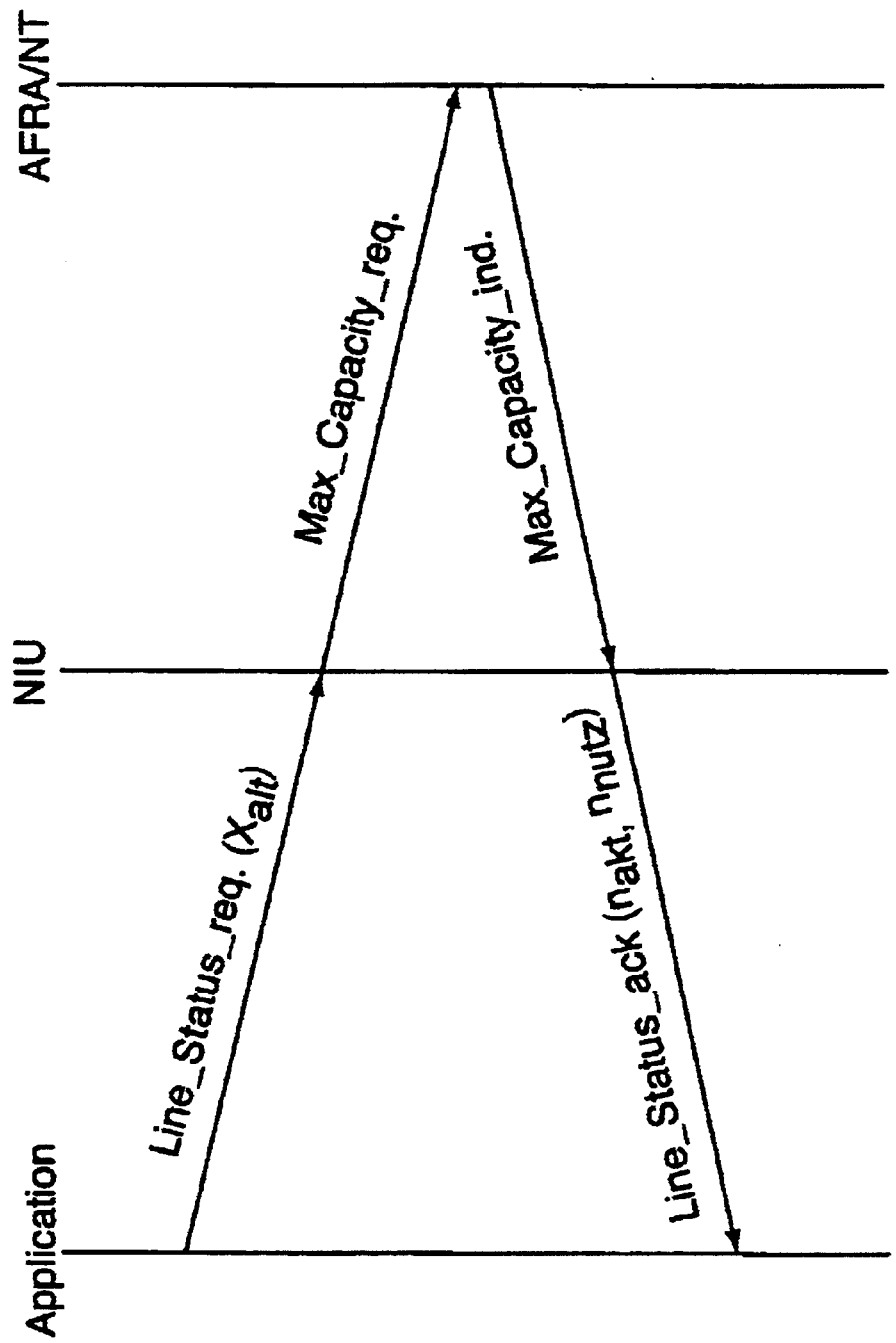
FIG. 4 depicts a flowchart of an exemplary flow of information between an application of a subscriber unit, a network interface unit of a subscriber unit, and a terminal unit of an extension line network.

Either when applications in the terminal system are made aware of a reduction of the available bitrate by the network interface unit NIU by means of the message Capacity_Modification_Indication, or when an application detects a deterioration of the transmission path on the basis of its own measurements, it can interrogate the number $n_{akt}$ and $n_{nutz}$ using the method illustrated schematically in FIG. 4. The network interface unit NIU informs the application in the message Line_Status_ack of the number of B channels that are available for it at the time. When this application occupies the number $x_{alt}$ B channels, the number $x_{neu}$ derives from:

$$x_{neu} = \max(n_{akt} - (n_{nutz} - x_{alt}), 0).$$

The application then has the ability to clear down the existing connection and to set up a new connection, potentially with fewer B channels, itself.

When the application determines that it needs more B channels than it is currently using, it prompts an information flow and a procedure according to FIG. 4.

Although other modifications and changes may be suggested by those skilled in the art, it is the intention of the inventors to embody within the patent warranted hereon all changes and modifications as reasonably and properly come within the scope of their contribution to the art.

I claim:

1. A method for automatically configuring subscriber equipment with a network interface unit for adapting the subscriber equipment to a terminal unit of a digital network, whose data rate can be adaptively adjusted dependent on the actual transmission conditions in the digital network, comprising the steps of:

determining a current maximum possible data rate between the network interface unit and said terminal unit with an exchange of messages between said network interface unit and said terminal unit;

comparing the current maximum possible data rate determined in said determining step to a value, which is stored in the subscriber equipment, of a previous maximum possible data rate;

storing the current maximum possible data rate in the subscriber equipment if said comparing step reveals a deviation between said current maximum possible data rate and the previous maximum possible data rate;

comparing the current maximum possible date rate to a data rate demand of currently existing connections of terminal device applications of the subscriber equipment; and configuring the current maximum possible data rate as the maximum allowable data rate of the network interface unit if the data rate demand of currently existing connections does not exceed the current maximum possible data rate.

2. A method for automatically configuring subscriber equipment as claimed in claim 1, further comprising the steps of:

if the data rate demand of currently existing connections exceeds the current maximum possible data rate, checking the data rate demand of currently existing connections, and when the data rate demand of the currently existing connections no longer exceeds the current maximum possible data rate, configuring the current maximum possible data rate as the maximum allowable data rate of the network interface unit.

3. A method for automatically configuring subscriber equipment as claimed in claim 1, further comprising the step of:

if the data rate demand of currently existing connections exceeds the current maximum possible data rate, delivering a message indicating that transmission quality is not guaranteed to at least one terminal device application of the subscriber equipment for which the currently existing connections are set up.

4. A method for automatically configuring subscriber equipment as claimed in claim 1, further comprising the step of:

delivering a message to the terminal unit with a new maximum allowable data rate of the network interface unit in case the current maximum possible data rate is configured as the maximum allowable data rate of the network interface unit.

5. A method for automatically configuring subscriber equipment as claimed in claim 1, further comprising the step of:

comparing the current maximum possible data rate to a value, which is stored in the subscriber equipment, of a maximum data rate supported by the terminal unit; and replacing the value of the current maximum possible data rate with the value of the maximum data rate that is supported by the terminal unit if the maximum data rate this is supported by the terminal is less than the value of the determined current maximum possible data rate.

6. A method for automatically configuring subscriber equipment as claimed in claim 1, further comprising the step of:

for determining a current maximum possible data rate between a network interface unit and said terminal unit, measuring transmission characteristics by the network interface unit and the terminal unit using an error rate with an exchange of information between the network interface unit and the terminal unit; and subsequently transferring the maximum transmission rate just measured to the network interface unit as a parameter, in a form of a message from the terminal unit.

7. A method for automatically configuring subscriber equipment as claimed in claim 1, further comprising the step of:

to prompt the step of determining of the current maximum possible data rate between network interface unit and terminal unit, transmitting a request message to the terminal unit by the network interface unit.

8. A method for automatically configuring subscriber equipment as claimed in claim 1, further comprising the steps of:

providing a transmission system having several payload channels between the network interface unit and the terminal unit, and providing that values of the data rates respectively correspond to a number of such payload channels.

9. Subscriber equipment with a data processing system comprising:

a processing unit, a storage unit, and a system bus connected to form a terminal device application;

a network interface unit for adapting the system bus to a terminal unit of a digital network, a data rate of said network interface unit being adaptively adjusted dependent on the actual transmission conditions;

means for determining a current maximum possible data rate between the network interface unit and the terminal unit;

means for storing a value of the maximum possible data rate;

means for comparing the stored value of the maximum possible data rate to the value of the determined current maximum possible data rate;

means for configuring a maximum allowable data rate of the network interface unit; and means for denying a connection set-up request of the terminal device application if the data rate demand of the connection that is to be set up exceeds the maximum allowable data rate.

* * * * *